United States Patent [19]

Pathak et al.

[11] Patent Number: 4,683,951

[45] Date of Patent: Aug. 4, 1987

[54] CHEMICAL FLOODING AND CONTROLLED PRESSURE PULSE FRACTURING PROCESS FOR ENHANCED HYDROCARBON RECOVERY FROM SUBTERRANEAN FORMATIONS

[75] Inventors: Prabodh Pathak, Plano; Stephen J. Salter, Dallas, both of Tex.

[73] Assignee: Atlantic Richfield Company, Los Angeles, Calif.

[21] Appl. No.: 863,663

[22] Filed: May 15, 1986

[51] Int. Cl.$^4$ .................. E21B 43/22; E21B 43/263
[52] U.S. Cl. .................. 166/271; 166/245; 166/273; 166/299; 166/308
[58] Field of Search .............. 166/271, 273, 299, 308

[56] References Cited

U.S. PATENT DOCUMENTS

| | | |
|---|---|---|
| 3,199,586 | 8/1965 | Henderson et al. ............ 166/271 X |
| 3,460,622 | 8/1969 | Davis, Jr. ............... 166/271 |
| 3,605,894 | 9/1971 | Jones ................. 166/273 |
| 3,630,284 | 12/1971 | Fast et al. .............. 166/299 |
| 4,039,030 | 8/1977 | Godfrey et al. ............ 166/299 |
| 4,064,935 | 12/1977 | Mohaupt ............. 166/299 X |
| 4,081,031 | 3/1978 | Mohaupt .............. 166/299 |
| 4,085,797 | 4/1978 | Trantham et al. .......... 166/273 X |
| 4,274,488 | 6/1981 | Hedges et al. ............ 166/273 |

OTHER PUBLICATIONS

Keough et al, "Applicability of Tailored Pulse Loading for Gas Well Stimulation", SPE 12837, May 13-15, 1984.

Cuderman et al, "A Proppant-Based Technology for Multiple Fracturing Wellbores to Enhance Gas Recovery: Application and Results in Devonian Shale", SPE 12838, May 13-15, 1984.

Hanson et al, "Multiple Fracture Stimulation Using Controlled Pulse Pressurization", SPE 12839, May 13-15, 1984.

*Primary Examiner*—George A. Suchfield
*Attorney, Agent, or Firm*—Michael E. Martin

[57] ABSTRACT

The effective permeability of subterranean hydrocarbon bearing formations with respect to surfactant and drive fluid injection processes is enhanced by preceding the surfactant fluid injection step with creation of multiple formation fractures using tailored pressure pulses produced by gas generating propellant canisters disposed in the injection well. Fluid injectivity rates are increased by subsequent fracture extensions provided by repeated steps of generating high pressure gas pulses at selected intervals.

9 Claims, 4 Drawing Figures

CHEMICAL FLOODING AND CONTROLLED PRESSURE PULSE FRACTURING PROCESS FOR ENHANCED HYDROCARBON RECOVERY FROM SUBTERRANEAN FORMATIONS

BACKGROUND OF THE INVENTION

1. Field of the Invention

The present invention pertains to a process for improving the recovery of hydrocarbon fluids from a subterranean formation including micellar fluid—polymer fluid injection and creation of multiple fractures with propellant generated controlled pressure pulses.

2. Background

In recovering certain types of hydrocarbon fluids from subterranean formations, the injection of predetermined quantities or slugs of surfactants comprising micellar-type fluids may be carried out usually following injection of a conditioning slug of water or similar fluid into the oil reservoir. The surfactant recovers residual fluids such as heavy hydrocarbon oils by reducing interfacial tensions and by changing the phase behavior of the fluids. The injection process is usually carried out using one or more injection wells which are located in a predetermined pattern also including one or more production wells.

Stable displacement of the relatively viscous surfactant through the reservoir requires that the mobility of the surfactant slug should be less than the mobility of the preceding bank or slug of oil and water produced by the water flooding process. Moreover, the injection of the surfactant is usually followed by injection of a still more viscous and less mobile slug of polymer fluid which is designed to displace the slug of surfactant and recoverable oil toward the production wells.

In the early stages of the aforementioned type of flooding process, injection rates are relatively high because the viscosities of water and certain types of surfactants are relatively low. However, micellar type fluids, for example, have viscosities which can be on the order of ten to twenty times greater than the viscosity of a water-oil slug being displaced through a formation and, accordingly, the injectivity rate during the injection of the micellar fluid-type surfactant decreases dramatically as compared with the injection rate of a fluid such as water or other less viscous fluids. Since drive fluids such as polymer fluids must be more viscous than the micellar fluid type surfactant, in order to provide a stable displacement or sweep of the formation, the injectivity rate during polymer fluid injection also decreases with respect to the injection rate of the micellar fluid.

Accordingly, it is desirable to increase the injection rate of surfactants and similar oil mobilizing fluids as well as to increase the rate of injection of subsequent or preceding drive fluids which are injected into the same zone in order to reduce the amount of capital required to provide the injection process. In this regard, it is clear that the process of micellar fluid-polymer fluid type flooding, in particular, may be uneconomic if injection rates are low because of the large investment in chemicals and injection equipment which is required to be utilized over a relatively long period of time. Hence, methods for improving the fluid injectivity rate and the oil displacement rate toward the production wells are constantly being sought. It is an object of the present invention to improve the injection rate and the resultant recovery rate of a chemical flooding process, particularly of the micellar fluid—polymer fluid type process by providing multiple fractures in the formation region being injected to, in effect, increase the formation permeability and the rate of driving of the desired mineral values to be recovered toward one or more producing wells.

SUMMARY OF THE INVENTION

The present invention provides an improved process for recovering hydrocarbon fluids from a subterranean formation which is flooded by a relatively viscous fluid such as a micellar fluid type surfactant by increasing the injectivity rate of the formation through producing multiple fractures in the formation region being produced using a high pressure gas generating source disposed in the injection well.

In accordance with one aspect of the present invention, chemical flood injectivity rates are increased in a micellar fluid—polymer fluid flooding process by creating multiple fractures in the formation region prior to injection of the micellar fluid utilizing a gas generating propellant for increasing the wellbore pressure above the pressure required to fracture the formation in a plurality of directions with respect to the wellbore. Fracturing the formation with a gas generating propellant provides a sufficiently high rate of pressure rise in the formation adjacent the injection well as to provide more evenly spaced, radially directed multiple fractures as compared with hydraulic fracturing processes, for example. Accordingly, fluid injection rates are increased, the fluid flood zone is more uniform and the flood frontal boundary is generally more circular in shape to thereby increase the production of formation fluids for a conventional pattern of injection and producing wells.

In accordance with another aspect of the present invention, there is provided an improved process for recovering hydrocarbon fluids through chemical flooding wherein multiple fracture initiation and extension processes are carried out so as to extend a plurality of radially extending fractures from an injection well to control the size of an area to be treated through chemical injections. In particular, multiple fractures may be initiated in the formation prior to injection of a micellar fluid charge or slug into the formation region to be produced so that a relatively uniform circular sweep or displacement of the flood front is accomplished toward a predetermined pattern of producing wells.

Extension of the fracture may be carried out through subsequent treatments by generating high pressure gases in the wellbore through controlled burning of propellant materials to extend the existing fractures and increase the fracture width prior to injection of more viscous drive fluids such as polymer type fluids. In this way, the injected fluids are uniformly distributed toward all of the producing wells, the flood front geometry for each type of chemical is not substantially distorted and the overall sweep and recovery efficiencies are high. Utilization of gas generating materials such as rocket propellants to provide controlled pressure pulses emanating from the wellbore into the formation provide improved fracture growth control by changes in the propellant characteristics, the propellant canister geometry, the pressure pulse magnitude and total pressurization. In this way, corrective action as far as growth and direction of fracture can be controlled as injection rates or flow directions tend to vary from those desired. Only fairly detailed knowledge about the reservoir rock fracture characteristics and the in situ stresses within the formation are required in order to design an effective gas fracturing treatment schedule.

Those skilled in the art will recognize the abovedescribed features and advantages of the present invention as well as other superior aspects thereof upon reading the detailed description which follows in conjunction with the drawing.

DESCRIPTION OF PREFERRED EMBODIMENTS

Figure 1:
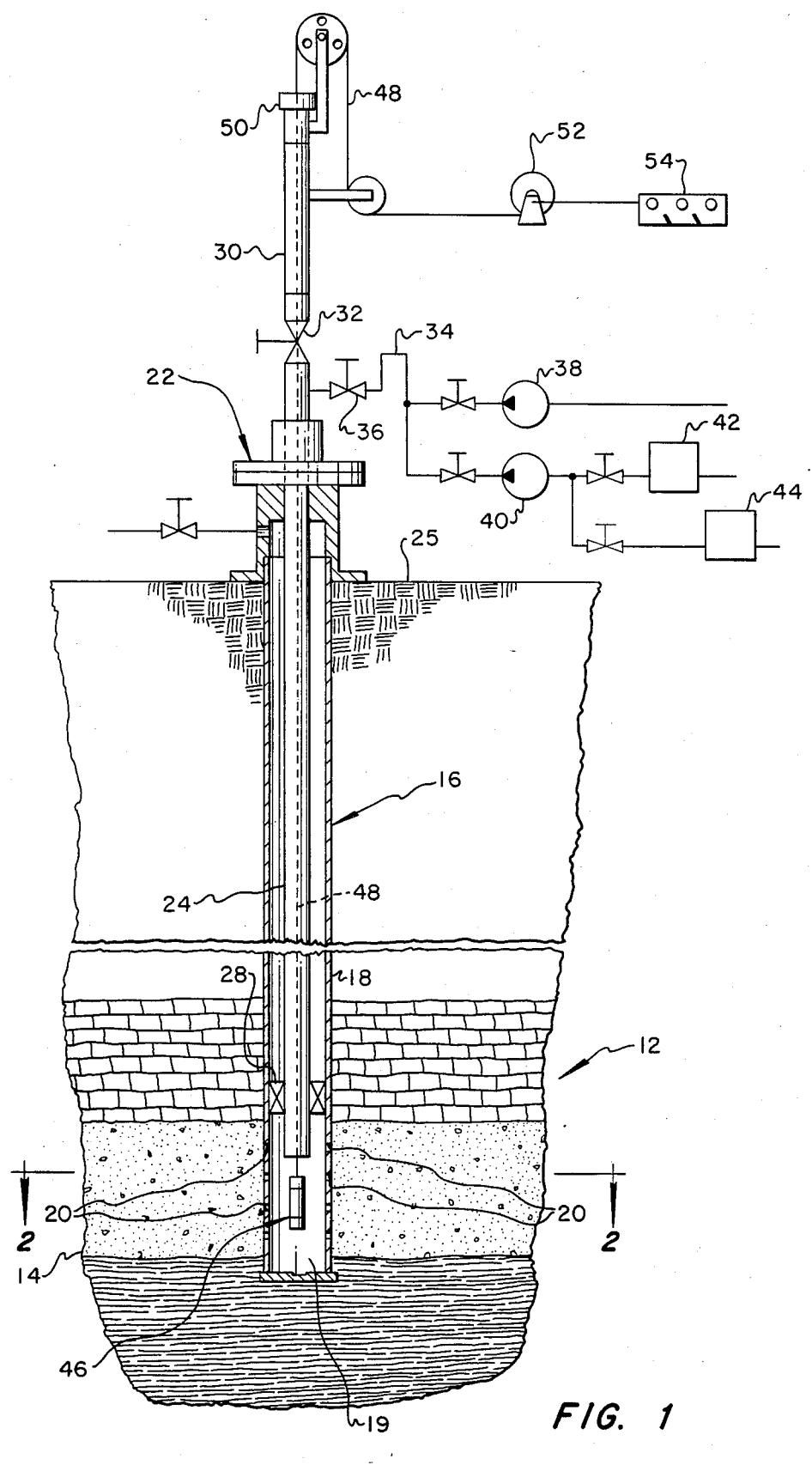
FIG. 1 is a vertical section view in somewhat schematic form of a subterranean earth formation including a fluid injection well which has been completed for the injection of petroleum recovery fluids and the generation of high pressure gas fracturing fluids using a propellant type gas generator.

In the description which follows, like elements are marked throughout the specification and drawing with the same reference numerals, respectively. The drawing figures are in generally schematic form, are not necessarily to scale and may represent a somewhat idealized or generalized treatment process.

Referring to FIG. 1, there is illustrated a somewhat schematic representation of a subterranean formation 12 having a zone or region 14 which is desired to be produced to recover hydrocarbon fluids such as crude oil which exist in the formation but which are no longer freely flowable toward one or more producing wells, not shown in FIG. 1. An injection well 16 has been drilled into the formation region 14 and is provided with a conventional casing 18 forming a wellbore 19 and having a plurality of circumferentially spaced perforation openings 20 communicating the wellbore with the formation region 14. The well 16 has been completed by the provision of a conventional wellhead 22 and a tubing string 24 extending into the casing 18 generally to the location of the region 14. The tubing string 24 may be sealed off from the interior of the casing 18 between the region 14 and the earth's surface 25 by a conventional packer 28, for example.

The wellhead 22 is adapted to include a conventional wireline lubricator 30, a shutoff valve 32 and an injection fluid flow conduit 34 having a shutoff valve 36 interposed therein. The injection fluid flow conduit 34 is in communication with a source of recovery fluids such as treated water, not shown, which may be supplied to the flow line 34 through a pump 38. A second pump 40 may also be placed in communication with the injection fluid flow conduit 34 for injecting a recovery fluid such as a micellar type fluid from a source 42 and a drive fluid such as a polymer type fluid from a source 44.

FIG. 1 also illustrates a gas generator propellant canister 46 disposed in the wellbore 19 below the packer 28 and suspended therein by a conventional wireline 48. The canister 46 has been lowered through the tubing string 24 on the wireline 48 in preparation for ignition of the canister to generate high pressure gases which provide a pressure pulse into the formation region 14 for a purpose to be described in further detail herein. The wireline 48 extends through the lubricator 30, a conventional stuffing box 50 and over suitable guide sheaves to a reel or drum 52. A conventional control panel 54 is operably connected to the wireline 48 for reading certain parameters desired to be monitored during generation of the high pressure gas pulse and to ignite the propellant canister 46.

Figure 2:
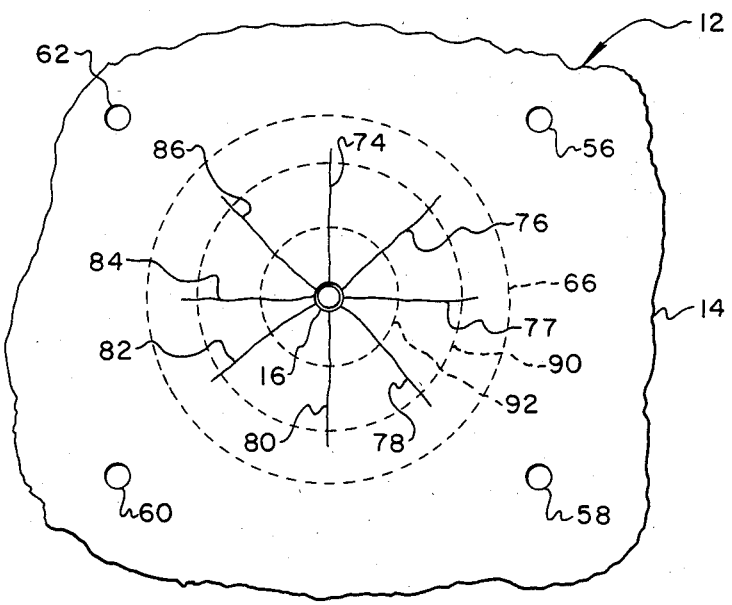
FIG. 2 is a plan view of the formation illustrated in FIG. 1 taken generally along the line 2—2 of FIG. 1.

Referring also to FIG. 2, there is illustrated a pattern of four producing wells 56, 58, 60 and 62. The wells 56, 58, 60 and 62 are arranged in a generally square pattern with respect to the injection well 16 and are typically drilled into the region 14 using conventional well drilling and completion techniques. The wells 56, 58, 60 and 62 might, for example, be centered at the corners of a twenty acre size zone or region to be produced by the process of the present invention. Generally, subterranean reservoirs having regions such as the region 14 of sandstone with permeabilities in the range of greater than 10 millidarcys and viscosities of oil in place in the range of less than 30 centipoises are considered suitable for recovery techniques utilizing micellar fluid—polymer fluid injection procedures. In accordance with the present invention, it is indicated that surprising improvements in formation permeability may be obtained by the creation and extension of multiple fractures in the formation region to be produced in reservoirs with permeabilities of less than 10 millidarcys and oil in place having viscosities greater than 30 centipoises.

In the well pattern illustrated in FIG. 2, a flushing liquid, such as water, has been injected into the formation region 14 to provide a generally circular front or boundary defined by the line 66. The location of the boundary 66 in the exemplary drawing figure indicates that the pattern is generally circular which can be assumed for a formation region of uniform structure and uniform permeability. In the position of the boundary 66 shown in FIG. 2, the flood front of the preflush liquid, such as water, is just at the production wells 56, 58, 60 and 62, or slightly short of passing these wells. At such a condition and prior to injection of a charge or slug of a micellar fluid type surfactant, for example, the permeability of the formation region 14 is preferably increased by the generation of high pressure gases in the wellbore 19. The propellant canister 46 is inserted into the wellbore 19 in the vicinity of the perforation openings 20 by inserting the canister in the lubricator 30 and lowering it into the position illustrated in FIG. 1 on the wireline cable 48 through the tubing string 24. The propellant canister 46 is illustrated in somewhat schematic form in the interest of clarity and conciseness. Certain conventional structural elements, including an instrumentation canister, a seal for the tubing string 24 to prevent the flow of propellant generated gases upward into the tubing string, and propellant ignition equipment are not illustrated. Reference may be made to publications including *Society of Petroleum Engineers* papers entitled "A Propellant Based Technology for Multiple Fracturing Wellbores to Enhance Gas Recovery: Application and Results in Devonian Shale" by J. F. Cuderman and D. A. Northrop; "Multiple Fracture Stimulation Using Controlled Pulse Pressurization" by J. M. Hanson, R. A. Schmidt, C. H. Cooley, and J. F. Schatz; and, "Applicability of Tailored Pulse Loading for Gas Well Stimulation" by D. D. Keough and D. R. Curran for information regarding high pressure gas generating processes for fracturing subterranean formations.

Figure 3:
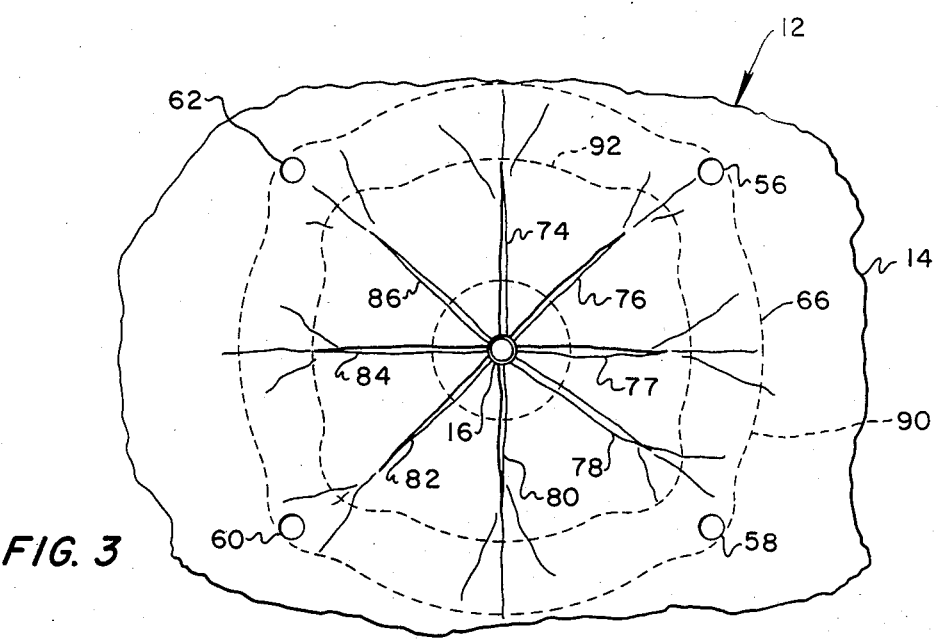
FIG. 3 is a plan view similar to FIG. 2 showing extension of the formation fractures due to subsequent treatments with propellant generated gas pressure pulses.
Figure 4:
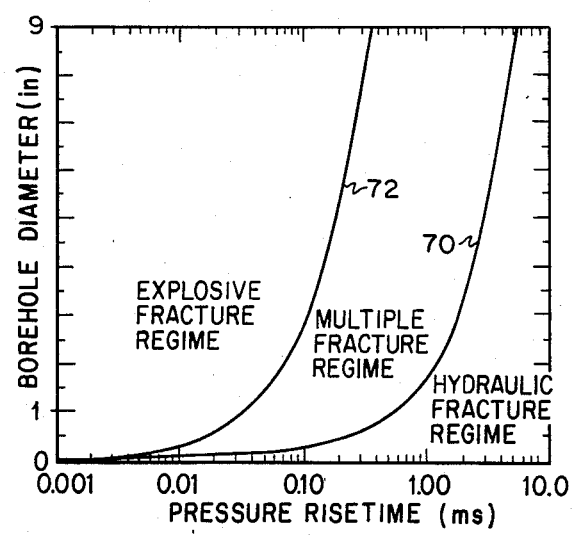
FIG. 4 is a diagram showing the general characteristics of pressure rise time for hydraulic fracturing, multiple fracturing due to controlled gas pressure pulses and explosive fracturing for given borehole diameters.

In the process of the present invention, after injection of water, for example, to provide the flood front defined by the boundary 66, the canister 46 would be ignited to generate quantities of high pressure gas to provide a pressure pulse of predetermined duration and pressure rise time in accordance with characteristics generally illustrated in the diagram of FIG. 4. Referring briefly to FIG. 4, there is illustrated a plot of pressure rise time in milliseconds versus bore hole diameter for the wellbore 19, for example, for a particular type of formation. The diagram of FIG. 4 is exemplary and the limits of the various fracture regimes, such as the hydraulic fracture, multiple fracture and explosive fracture regimes would be affected by the formation rock properties and in situ stresses. The area between the boundary lines 70 and 72 in FIG. 4 indicates generally the pressure rise times measured in the wellbore which would create multiple, radial formation fractures such as the fractures illustrated in FIG. 2 and designated by the numerals 74, 76, 77, 78, 80, 82, 84 and 86. As indicated by the diagram of FIG. 4, pressure rise times generally in excess of from about 1.0 milliseconds to 5.0 milliseconds for wellbore diameters in the range of 1.5 inches to 9.0 inches, respectively, provide the type of fracture usually associated with hydraulic fracturing. This type of fracture typically provides a generally vertically extending two-winged fracture extending from the wellbore 19 in an indeterminate direction with respect to the wellbore axis. Accordingly, a hydraulic fracture into a formation to be produced by a micellar fluid—polymer fluid flooding process might produce a relatively low efficiency recovery depending on the direction of the fracture wings with respect to the location of the producing wells. However, for a symmetrical pattern of producing wells with respect to the location of the injection well, such as illustrated in FIGS. 2 and 3, the creation of multiple radial fractures such as the primary fractures illustrated and emanating from the well 16 will provide a more uniform flood front of the micellar fluid slug and the polymer fluid slug, also.

Referring further to FIG. 2, the flood front or boundary line for the slug of micellar fluid is indicated by the numeral 90. Prior to injection of the slug of micellar fluid to form the boundary 90, the fractures 74, 76, 77, 78, 80, 82, 84 and 86 have been created by the ignition of the propellant canister 46 to generate high pressure gases at a rate such as to create pressure rise times in the wellbore 19 for a given wellbore diameter to provide multiple fractures which extend into the formation region 14 to fracture the formation in the manner illustrated by the somewhat idealized fracture pattern in FIG. 2.

After generation of the fracture pattern illustrated in FIG. 2, the wireline 48 would be withdrawn through the tubing string 24, the valve 32 closed and the pump 40 operated to discharge or pump a predetermined quantity of micellar fluid through the tubing string 24 and into the formation 14 through the perforations 20. If it is indicated that the injectivity rate is decreasing during injection of the micellar fluid slug, injection may be terminated and a second propellant canister lowered into the wellbore 19 and ignited to generate a predetermined pressure pulse having a desired pressure rise time to extend the fractures illustrated in FIG. 2 radially outwardly from the well 16. The pressure rise time and pressure pulse duration may also be tailored to increase the fracture width and possibly generate new secondary fractures as illustrated by the growth of the fractures 74, 76, 77, 78, 80, 82, 84, and 86, as indicated in FIG. 3. The generation of the controlled gas pressure pulse by igniting a second, third or subsequent propellant canisters can be carried out by gradually increasing the pressure pulse magnitudes and durations to extend the fractures further into the reservoir, followed by further injection of micellar fluid after each pressure pulse generation process so as to sweep the recoverable oil toward the producing wells 56, 58, 60 and 62, at an increased rate and with a more thorough recovery process.

In FIG. 3, the micellar fluid flood boundary 90 is shown extended generally to the respective producing wells 56, 58, 60 and 62 where it becomes generally coincident with the waterflood front 66. FIG. 3 also illustrates a second boundary 92 which represents the frontal boundary of a slug of polymer fluid which has been injected after injection of the micellar fluid slug to drive the water-oil-surfactant mass toward the respective producing wells. The growth of the fractures 76, 77, 78, 80, 82, 84, and 86, provides a more uniform and symmetrical boundary 92, although generally speaking not a circular one, to increase the overall efficiency of the treatment process as regards the total recovery of hydrocarbon fluids from the respective producing wells.

Accordingly, the recovery of hydrocarbon fluids from a formation which typically can be produced by a micellar fluid—polymer fluid flooding process would include the steps of initially injecting or flooding the formation region 14 with treated water to drive oil toward the producing wells 56, 58, 60 and 62, and to condition the formation region for injection of the micellar fluid. After flooding the region 14 to provide the water flood front 66 either at or slightly beyond the producing wells, water injection through the tubing string 24 and the perforations 20 would be terminated and a propellant canister 46 lowered into the wellbore 19. The propellant material in the canister 46 may be selected to generate a sufficient amount of gas pressure over a period of time to the maximum pressure to fall in a region on the diagram of FIG. 4 between the curves 70 and 72. For example, for a wellbore diameter of 6 inches, a pressure rise time to the maximum pressure of 0.2 milliseconds to 1.4 milliseconds would likely generate the multiple fracture pattern illustrated in FIG. 2, depending on the rock properties of the formation region and in situ stresses of the region.

After an initial fracturing process to generate the fracture pattern illustrated in FIG. 2, comprising multiple fractures in said formation extending substantially radially from said injection well but not beyond said flood front, injection of a surfactant such as micellar type fluid is commenced by pumping such a fluid through the pump 40, the flow conduit 34 and the tubing string 24 to form the flood front or boundary 90. During the micellar fluid injection process, if it is determined that the injectivity rate is decreasing below that which is desired, micellar fluid injection may be ceased temporarily. A second treatment to extend or widen the fractures 76, 77, 78, 80, 82, 84, and 86, may be carried out by lowering another propellant canister 46 into the wellbore 19 and firing same to generate a gas pressure pulse to extend the fracture regime to the condition illustrated in FIG. 3, for example. The micellar fluid injection can then be resumed to drive the flood front 90 to the distance illustrated in FIG. 3.

After sufficient injection of micellar fluid, the pump 40 may be switched to pumping a drive fluid such as a polymer-type fluid through the flow conduit 34 and the tubing string 24 to create the flood front 92 expanding uniformly outwardly toward the producing wells 56, 58, 60 and 62, from the injection well 16. Again, if during or prior to substantial injection of polymer fluid, it is determined that the permeability of the formation region 14 needs to be increased a third or subsequent fracturing or fracture extension process may be carried out by a tailored generation of gas pressure pulses using a rocket propellant type canister such as the propellant canister 46 lowered into the wellbore 19 and ignited to generate a quantity of high pressure gas.

It will be appreciated from the foregoing that surprising and unexpected results may be obtained for enhanced hydrocarbon fluid recovery processes using micellar fluid—polymer fluid type floods or drives by rather specific intervals of increasing the effective permeability of the formation being produced by generation of multiple fractures using tailored gas pressure generation processes as described herein. Although preferred embodiments of the present invention have been described in detail, those skilled in the art will recognize that various substitutions and modifications may be made to the invention without departing from the scope and spirit of the appended claims.

What we claim is:

1. A method for producing hydrocarbon fluids from a subterranean formation into which at least one injection well and at least one production well have been drilled, respectively, said method comprising the steps of:

injecting fluid into said formation through said injection well to form a flood front extending toward said at least one production well;

terminating injection of said fluid;

placing gas generating means in said injection well and generating a relatively high pressure pulse of gas in said injection well to create multiple fractures in said formation extending substantially radially from said injection well but not beyond said flood front;

injecting a surfactant into said injection well after creating said multiple fractures to form a generally uniformly expanding flood front in said formation extending toward said at least one production well; and injecting a drive fluid into said injection well to drive the slug of surfactant and hydrocarbon fluids toward said at least one production well for the production of said hydrocarbon fluids therefrom.

2. The method set forth in claim 1 wherein:
the step of injecting said drive fluid includes injecting a polymer-water solution into said formation.

3. The method set forth in claim 1 wherein:
the step of injecting said surfactant includes injecting a micellar fluid into said formation through said injection well.

4. The method set forth in claim 1 wherein:
the step of injecting a drive fluid after injection of said surfactant includes injecting a polymer type fluid having a viscosity greater than the viscosity of said surfactant to form a drive fluid front which expands generally uniformly from said injection well toward said at least one production well to sweep the formation regions being recovered substantially free of said surfactant-hydrocarbon fluid mixture.

5. The method set forth in claim 1 including the step of:

placing second gas generating means in said injection well and generating a high pressure pulse of gas to extend the fractures in said formation prior to injection of said drive fluid.

6. A method for producing hydrocarbon fluids from a subterranean formation into which at least one injection well and a plurality of spaced apart production wells have been drilled, respectively, said method comprising the steps of:

injecting fluid into said formation through said injection well to form a flood front extending toward said production wells;

placing first gas generating means in said injection well and generating a relatively high pressure pulse of gas in said injection well with said gas generating means to create multiple radially extending fractures in said formation extending radially from said injection well toward said production wells;

injecting a surfactant into said injection well to form a generally uniformly expanding flood front in said formation extending toward said production wells;

terminating injection of said surfactant into said injection well;

placing second gas generating means in said injection well and generating a high pressure pulse of gas to extend said fractures in said formation radially from said injection well; and injecting a drive fluid into said injection well to drive said surfactant and hydrocarbon fluids toward said production wells for the production of said hydrocarbon fluids therefrom.

7. A method for producing hydrocarbon fluids from a subterranean formation into which at least one injection well and a plurality of spaced apart production wells have been drilled, respectively, said method comprising the steps of:

injecting fluid into said formation through said injection well to form a flood front extending toward said production wells;

generating a first relatively high pressure pulse of gas in said formation to create multiple radially extending fractures in said formation extending substantially radially from said injection well toward said production wells;

injecting a surfactant into said injection well to form a generally uniformly expanding flood front in said formation extending toward said production wells;

terminating injection of said surfactant into said injection well;

generating at least a second high pressure pulse of duration and magnitude such as to extend said fractures in said formation radially from said injection well;

resuming injection of said surfactant into said formation through said injection well; and then injecting a drive fluid into said injection well to drive the slug of surfactant and hydrocarbon fluids toward said production wells for the production of said hydrocarbon fluids therefrom.

8. The method set forth in claim 7 wherein:

the step of injecting a drive fluid after injection of said surfactant includes injecting a polymer type fluid having a viscosity greater than the viscosity of said surfactant to form a drive front which expands generally uniformly from said injection well toward said production wells to sweep the formation regions being recovered substantially free of a surfactant-hydrocarbon fluid mixture.

9. The method set forth in claim 7 including the step of:

generating a high pressure pulse of gas to extend fractures in said formation radially outward from said injection well prior to injection of said drive fluid.

* * * * *